Dec. 11, 1945.   A. E. DROBISH ET AL   2,390,784
DEVICE FOR TESTING ELECTRICAL CONDENSERS
Filed Feb. 6, 1943   2 Sheets-Sheet 1
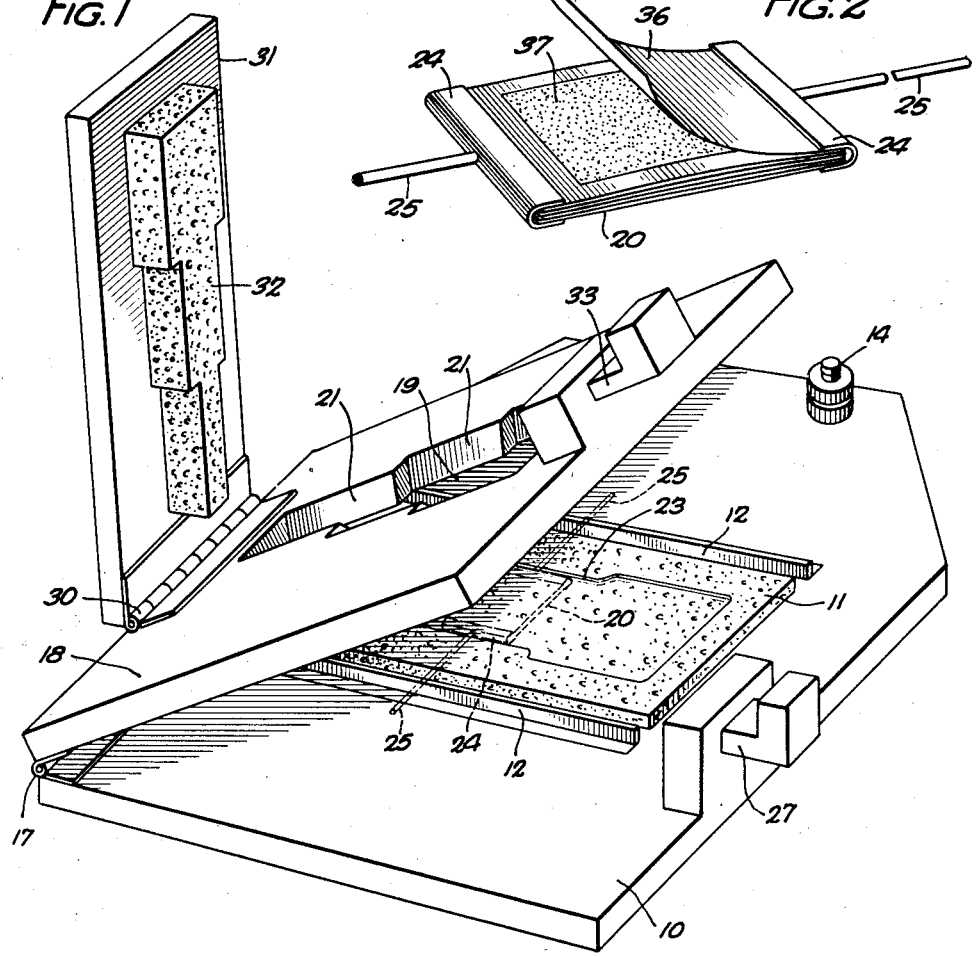
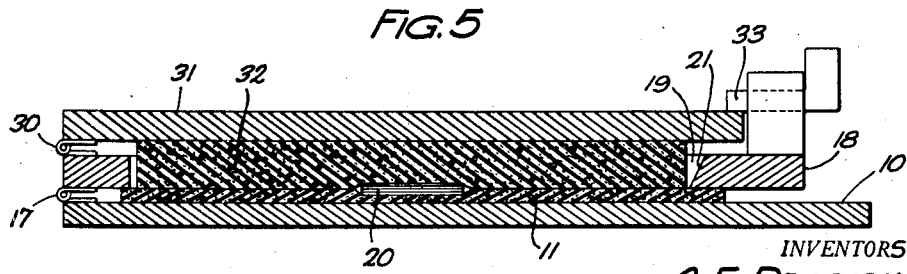
INVENTORS
A. E. DROBISH
R. A. KAY
BY
ATTORNEY.

Dec. 11, 1945.   A. E. DROBISH ET AL   2,390,784
DEVICE FOR TESTING ELECTRICAL CONDENSERS
Filed Feb. 6, 1943   2 Sheets-Sheet 2
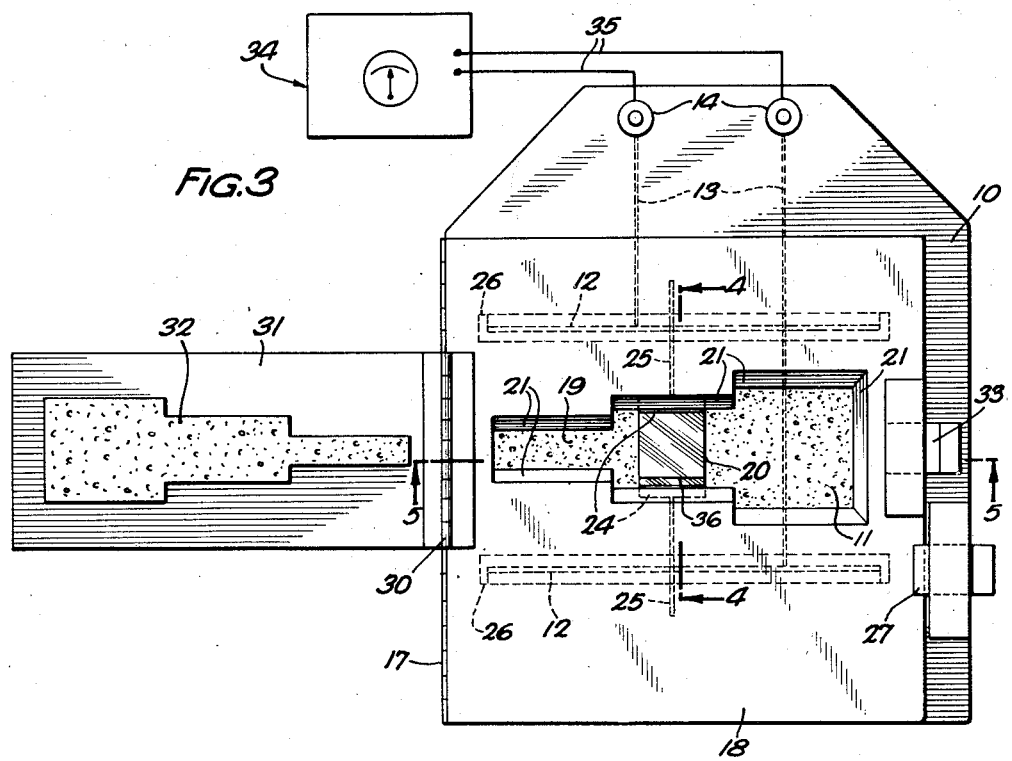
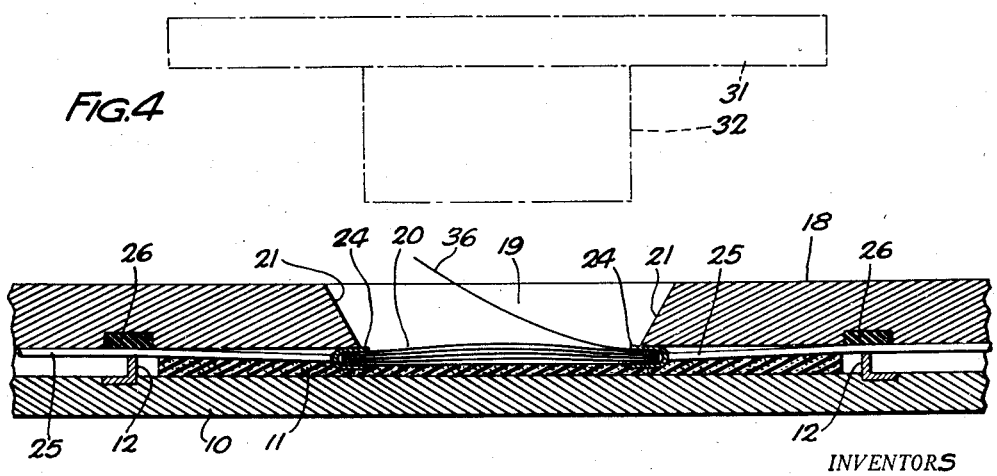
INVENTORS
A. E. DROBISH
R. A. KAY
BY
ATTORNEY Patented Dec. 11, 1945

2,390,784

UNITED STATES PATENT OFFICE 2,390,784

DEVICE FOR TESTING ELECTRICAL CONDENSERS

Adolph E. Drobish, Oak Park, and Riley A. Kay, Downers Grove, Ill., assignors to Western Electric Company, Incorporated, New York, N. Y., a corporation of New York Application February 6, 1943, Serial No. 474,956

4 Claims. (Cl. 29—25.42)

This invention relates to devices for testing electrical condensers and more particularly to devices combining means for holding and testing electrical condensers during adjustment and while under test simulating pressure conditions thereof after it is encased in a molded housing, the finished condenser being of the fixed capacity type.

The present invention is particularly applicable to capacity testing and adjusting of condenser stacks before being encased in a molded housing. Such condenser stacks, in some instances, may comprise thin laminae of dielectric material, such as mica sheets, having a metal film, such as silver, on each side of each thin lamina, continuous strips of metal foil folded into flat loops entering between adjacent laminae to make electrical contact with the metal film on the laminae and folded over the edges of the laminae, outer sheets of mica without the metal film and metallic terminal supporting members embracing the folded foils and the laminae edges and clinched thereon, one of the outer mica sheets at one end not being embraced by the supporting member.

An object of this invention is the provision of a simple and practicable device for efficiently holding and testing for capacity such condensers during adjustment and, while under test, simulating pressure conditions after it is encased in a molded housing.

In accordance with the above object, the present invention, in one embodiment thereof, as applied to the capacity testing and adjustment of the before described type of condenser stack and while under test simulating pressure conditions thereof after it is encased in a molded housing, comprises a base having a rubber mat for supporting the condenser stack, and fixed conductor bars connected to a suitable capacity testing set for making electrical connection with terminals of the stack. Hinged to the base is a plate having an aperture of different widths for exposing the upper faces of different sizes of stacks and through which aperture a tool may be used to remove a portion of the metal film on the upper lamina to vary the condenser stack capacity, the plate being latchable to the base. A second plate is hinged to the first plate and is provided, upon its lower face, with a projecting rubber platen having a contour adapted to fit into the multiple width aperture in the first plate and press against the condenser stack under test upon being swung over the first plate and latched, thus compressing the stack while it is being tested to simulate pressure conditions of the stack after it is encased in a molded housing.

Other objects and advantages of this invention will more fully appear from the following detailed description, taken in conjunction with the accompanying drawings, in which Fig. 1 is a perspective view of a condenser stack testing device embodying the features of the invention shown open and ready for use with a condenser stack shown in broken outline in position for capacity testing and adjusting;

Fig. 2 is an enlarged perspective view of a condenser stack of a type to be tested for capacity and adjusted in the device shown in Fig. 1;

Fig. 3 is a plan view of the device and a diagrammatic illustration of a capacity testing set connected thereto, the device being shown in condition during testing and adjusting operations;

Fig. 4 is an enlarged vertical section taken on the line 4—4 of Fig. 3, the pressure platen being shown in broken outline thereabove; and Fig. 5 is an enlarged vertical section taken on the line 5—5 of Fig. 3, the holding plate and pressure platen being shown in their latched positions.

Referring to the drawings in detail, 10 indicates a base, preferably of insulating material, having fixed to its upper face a rectangular shaped mat 11 of soft rubber. Fixed in the upper face of the base 10 along each longitudinal edge of the mat 11 is an electrical conducting bar 12, the bars being connected by conductors 13 to terminal posts 14 secured to the base. Hinged, as indicated at 17, to an end of the base 10 is a plate 18 of insulating material having an irregularly shaped aperture 19 provided, in the present embodiment, with three different widths to accommodate three different sizes of condenser stacks to be tested and adjusted, one size of condenser stack being indicated at 20. The longitudinal side walls of the aperture 19 at each width and at one end are sloped, as indicated at 21, to facilitate access to and adjustment of the condenser stack during its testing and adjustment in a manner to be described hereinafter. When the plate 18 is swung down into operative position (Figs. 3, 4 and 5), the aperture 19 thereof is centrally disposed longitudinally with the rubber mat 11 and thus a condenser stack 20, placed on the mat when the plate 18 is in its inoperative position (Fig. 1), is exposed at its upper face at the particular width of the aperture 19, depending on the size of the condenser stack, when the plate is lowered to its operative position. The rubber mat 11 may be slightly indented along its length, indicated at 23 (Fig. 1), in accordance with the different widths of the aperture 19, to facilitate the positioning of the condenser stack 20 on the mat when the plate 18 is in its inoperative position. Terminal supporting members 24 of the condenser stack 20 carry conducting terminals 25 at opposite ends (Figs. 1, 2 and 4), which are pressed downwardly into contact with the conducting bars 12 of the base 10 when the plate 18 is in its operative position. Carried by the inner or lower face of the plate 18 (Fig. 4), in alignment with the bars 12, are rubber strips 26, which serve to yieldably press the condenser terminals 25 into contact with the conducting bars 12. A latch member 27, slidably mounted on the base 10, is arranged for movement into latching position over the upper face of the plate 18 when the plate is lowered to its operative position, thus firmly holding the condenser stack 20 against the rubber mat 11 in a manner best shown in Fig. 4.

Hinged to the plate 18, as indicated at 30, at the same end of the base 10 to which the plate 18 is hinged, is a pressure plate 31, carrying upon its inner or lower face a rubber platen 32, which has a contour matching the contour of the multiple width aperture 19 of the plate 18 and into which it freely enters when the plate 31 is lowered to its operative position (Fig. 5). The thickness of the rubber platen 32 is such that when it is pressed downwardly sufficiently to permit a latch member 33 slidably mounted on the plate 18 to be moved into latching position over the upper face of the plate 31, it serves to compress the condenser stack 20. This compression of the condenser stack 20, which occurs during testing for capacity, is such that it simulates the pressure conditions of the stack after it is encased in a molded housing in a subsequent operation.

In use, the terminal posts 14 of the device are connected to a capacity testing set 34 (Fig. 3) by means of leads 35. The testing set 34 is shown diagrammatically and is not disclosed nor described in detail since such testing sets are familiar and well-known. It may comprise a source of alternating current feeding a four-armed bridge circuit, of which two resistors and a standard condenser would be three arms and the condenser to be tested would be the fourth, while a voltmeter or ammeter of appropriate design and sensitivity would be in the bridge circuit.

To test and adjust the capacity of a condenser stack 20 of the type herein described (Fig. 2), it is first placed in the indentation 23 of the rubber mat 11 (Fig. 1) with its terminals 25 engaging the conducting bars 12 which are connected to the testing set 34. The condenser stacks 20 are preferably assembled so that they will have an initial capacity equal to or slightly higher than that desired after being encased in a molded housing. A fixed capacity type of condenser showing an overcapacity is adjusted in a manner to be described. After placing the condenser stack 20 in the indentation 23, the apertured plate 18 is brought down and latched to the base 10, as shown in Figs. 3 and 4. This securely holds the condenser stack 20 against the yieldable rubber pad 11 across the members 24, as shown clearly in Figs. 3 and 4, with its upper face exposed through the aperture 19 of the plate 18. The pressure plate 31 is then brought down and latched to the plate 18, as shown in Fig. 5. The latching of the plate 31 compresses the condenser stack 20 by means of the projecting rubber platen 32 and the resulting pressure on the condenser stack is such that it simulates pressure conditions of the stack after it is encased in a molded housing. In this condition of the condenser stack 20, the terminals 25 of which are connected to the capacity testing set 34, the indicated capacity will be either the desired capacity of the finished condenser or its capacity will be higher than that desired. In the case of the latter condition, the pressure plate 31 is unlatched and raised to expose the upper face of the condenser stack 20 and the operator then raises the uppermost mica sheet, indicated at 36 (Figs. 2 and 4), which is free at one end, to expose the upper mica sheet having the silver film indicated at 37 (Fig. 2) and, by means of a suitable tool, scrapes some of the silver film therefrom. The pressure plate 31 is then again lowered and latched and the capacity again noted on the testing set 34. If the desired capacity has been reached, the condenser stack 20 is removed from the fixture, but if an overcapacity is indicated, the adjusting operation is repeated until the desired capacity is reached.

It will be understood that the embodiment herein described is merely illustrative of the invention and one application thereof and that modifications can be made and it is capable of other applications.

What is claimed is:

1. An apparatus for testing the capacity of condensers comprising a fixed base, electrical contacts on said base, a testing circuit connected to said contacts, a rubber mat on said base indented to predeterminedly position a condenser thereon relative to said contacts, means having an aperture associated with said base for clamping a condenser thereon in engagement with said contacts and exposing the condenser for adjustment while clamped to said fixed base, and a pressure device registrable for entrance into said aperture for applying a predetermined pressure to the condenser while it is being tested.

2. An apparatus for testing and adjusting the capacity of condensers comprising a base, elongated electrical contacts on said base, a testing circuit connected to said contacts, a yieldable support arranged on said base between said contacts shaped to predeterminedly position condensers of different sizes thereon relative to said contacts, means having an aperture of various widths corresponding to different sizes of condensers associated with said support for holding a condenser thereon in engagement with said contacts and exposing the condenser for adjustment, and a pressure device including a rubber platen of varying widths corresponding to said aperture and registrable for entrance therein for applying a predetermined pressure to the condenser while it is being tested.

3. An apparatus for testing and adjusting the capacity of condensers comprising a support for a condenser, a testing circuit, an apertured plate hinged to said support and movable into position for holding a condenser on said support and exposing the condenser for adjustment, means for latching said plate in its holding position, a pressure device hinged to said plate and carrying a yieldable platen registrable for entrance into said aperture for applying a predetermined pressure to the condenser while it is being tested, and means for latching said device in its pressure applying position.

4. A device for testing and adjusting the capacity of electrical condenser stacks and while under test simulating pressure conditions thereof after it is encased in a molded housing, the condenser stacks being of the type which include a plurality of laminae of dielectric material stacked together and having films of metal on the faces of some of the laminae and terminals extending from the stack, comprising a base, a yieldable support on said base for receiving a condenser stack, contacts carried by said base for contacting the stack terminals, a capacity testing set connected to said contacts, a plate for holding the stack in position and pressing the stack terminals into engagement with said contacts, said plate having an aperture for exposing the upper face of the stack to permit the scraping of a portion of the metal film from a lamina to vary the capacity of the stack, and pressure means movable through said aperture in the plate to compress the stack while it is being tested to simulate pressure conditions thereof after being encased in a molded housing.

ADOLPH E. DROBISH.
RILEY A. KAY.